United States Patent [19]
Roberts

[11] 3,953,056
[45] Apr. 27, 1976

[54] BOOKBINDING WITH PLASTIC COVERS
[75] Inventor: Alvin V. Roberts, Scarsdale, N.Y.
[73] Assignee: Bookwrights, Inc., New York, N.Y.
[22] Filed: June 18, 1974
[21] Appl. No.: 480,488

Related U.S. Application Data
[63] Continuation of Ser. No. 261,513, June 9, 1972, abandoned.

[52] U.S. Cl................................. 281/29; 156/212; 156/257; 156/272; 156/273; 264/295
[51] Int. Cl.²........................................... B42D 1/00
[58] Field of Search ............... 281/21, 29; 156/272, 156/273, 212, 257; 264/295

[56]           References Cited
          UNITED STATES PATENTS

| | | | |
|---|---|---|---|
| 2,393,541 | 1/1946 | Kohler | 156/272 X |
| 2,478,132 | 8/1949 | Schade | 281/29 X |
| 3,088,753 | 5/1963 | Sendor | 281/29 |
| 3,093,396 | 6/1963 | Segreto | 281/21 R |
| 3,168,424 | 2/1965 | Sendor | 281/29 X |
| 3,454,694 | 7/1969 | Delaire et al. | 264/295 X |
| 3,730,806 | 5/1973 | Heller et al. | 281/21 R |

FOREIGN PATENTS OR APPLICATIONS
1,015,952   12/1952   France................................. 281/29

Primary Examiner—Jerome Schnall
Attorney, Agent, or Firm—Sandoe, Hopgood & Calimafde

[57]         ABSTRACT

For binding books with plastic covers, this invention cuts the covers from plastic stock such as calendered sheets or continuous webs; and the plastic is preferably one that can be cut from the stock with a die used with a high frequency electromagnetic field for softening the plastic. In the preferred method, a tear line is formed around the outline of the cover and the cover is torn from the sheet with a smooth tear. The leaves constituting the filler for the book are assembled, stabilized with adhesive and then trimmed before assembly with the cover. With plasticized covers, provision is made for preventing migration of the plasticizer into the adhesive with possible resulting loss of strength of the adhesive. By using electromagnetic adhesive to stabilize the filler, the adhesive can be activated by an alternating electromagnetic field when desired to secure the filler to the spine portion of the cover.

10 Claims, 8 Drawing Figures

U.S. Patent  April 27, 1976  3,953,056
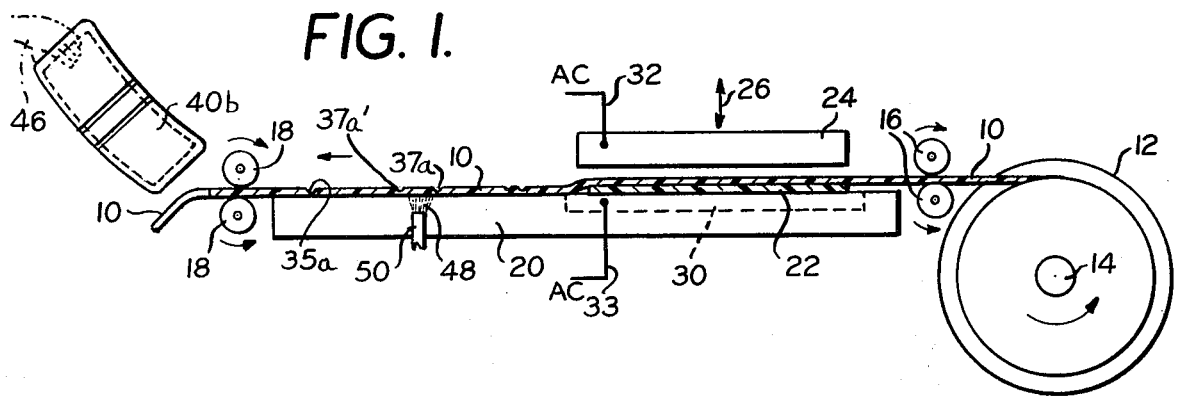
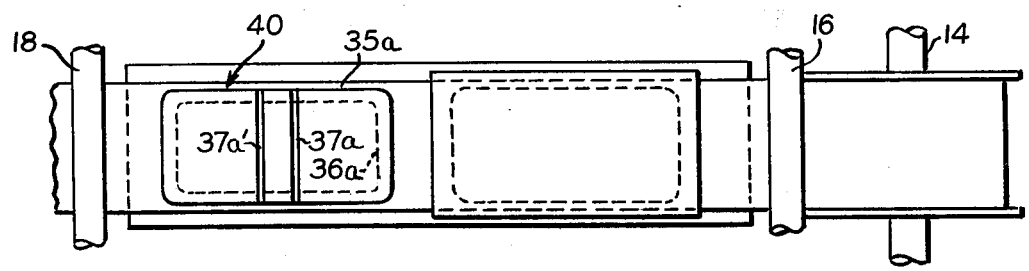
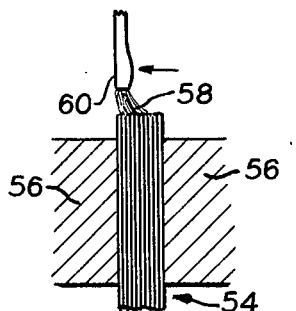
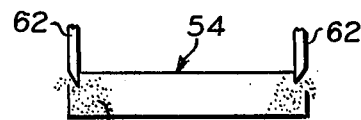
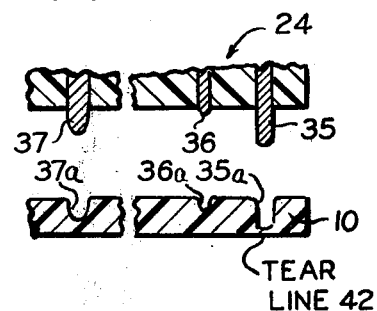
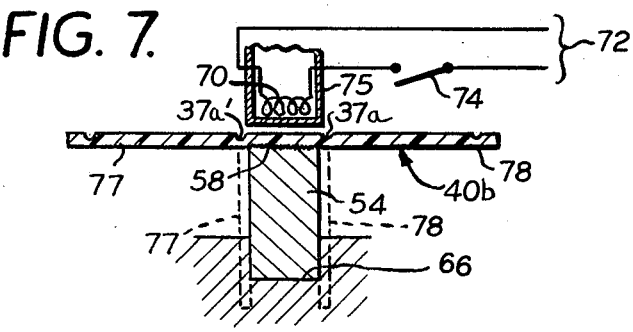
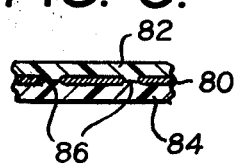

BOOKBINDING WITH PLASTIC COVERS

RELATED PATENT

This application is a continuation of my co-pending application Ser. No. 261,513, filed June 9, 1972 for BOOKBINDING WITH PLASTIC COVERS, now abandoned.

BACKGROUND AND SUMMARY OF THE INVENTION

The cost of high grade bookbinding has become so expensive that it puts books beyond the reach of many readers, and forces people to wait until the book is put out into a "paperback" edition.

This invention is directed to methods for making books with plastic covers and in ways that lend themselves to automation and with reduced binding costs so that the books with covers that extend beyond the edges of the pages, and that are stiff enough to support the book without folding under the pages and breaking, can be made at reasonable cost.

The cover is made of plastic and preferably from a plastic that can be heated by an electric field in a period of very short duration and to a temperature at which the plastic is soft enough to flow so that the rules of a die can be brought down to displace the plastic around the entire outline of the cover except for a very thin tear section which holds the cover in place but which permits the cover to be torn from the web quickly and easily. The plastic has sufficient resilience so that the edge along the tear springs back to leave a smooth even edge around the full perimeter of the cover. The die can be, and preferably is, made with curved rules at the corners of the cover so that the corners of the book are rounded in the finished book.

The invention has its greatest utility in making high grade books where the cover extends beyond the edges of the pages and this requires that the plastic used be stiff enough so that when the book is finished the edges of the cover that extend below the bottom edges of the pages of the filler are sufficiently stiff to support the weight of the filler without folding under and breaking as occurs when books are made with paper covers extending beyond the edges of paper.

In the preferred method, the leaves constituting the filler for the book are assembled and then stabilized; that is, held in assembled relation by connecting them together along the spine portion of the filler so that the filler can be handled in subsequent operations without resorting to the use of clamps to hold the pages in the desired assembled relation.

With the method of this invention, the material used for the cover is often plasticized. By compounding the plastic with plasticizers, greater control over the stiffness and other physical properties of the plastic can be obtained. Where a problem of plasticizer migration is presented, a barrier coat or other means are used to prevent the plasticizer in the cover from migrating into the adhesive used on the pages of the filler. This migration is usually a gradual process but over a long period can greatly weaken the adhesive so that the book no longer has the necessary strength to hold the filler securely in the cover.

Another feature which lends itself to automation is the use of "electromagnetic adhesive". This term is used to cover constructions of the adhesive which permits adhesive to be activated by subjecting it to an alternating electromagnetic field. Adhesive can be made "electromagnetic" by including in the adhesive metal powder, especially ferrous metal powder, which is strongly heated by an alternating magnetic field. Electromagnetic adhesive can also be provided by coating both sides of a thin metal foil or strip with adhesive coating both sides of a thin metal foil or strip with adhesive which is softened by heat generated within the metal by a magnetic field adjacent to the metal. Such a foil or strip with adhesive on both sides has the advantage that the adhesive on the side which faces the book cover can be one which is particularly effective with the particular plastic used for the cover, and the adhesive on the other side can be adhesive which is particularly effective with paper but not so effective with plastic. It is, of course, necessary that both adhesives bond securely to the metal and they should also bond to each other if the construction is one where the metal is perforated to permit interlocking of the adhesives through the perforations of the metal.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view showing the manufacture of the cover in accordance with this invention, the cover being made from a continuous web of plastic;

FIG. 2 is a top plan view of the structure shown in FIG. 1;

FIG. 3 is a diagrammatic end view of a group of pages constituting a filler for a book, the sheets being held together by clamps and being shown in the process of being stabilized by the application of adhesive to the spine of the filler;

FIG. 4 is a diagrammatic view of the filler of FIG. 3 looking at the filler from the spine end and showing the trimming of the top and bottom edges of the leaves;

FIG. 5 is a greatly enlarged, fragmentary sectional view showing the way in which the die of FIG. 1 operates on the plastic to cause depressions for hinge lines and for a tear line;

FIG. 6 is an isometric view showing a cover torn from the web shown in FIGS. 1 and 2, the view being of the outside of the cover;

FIG. 7 is a diagrammatic sectional view through a cover and filler showing the application of the cover to the filler and reactivation of the adhesive by an electromagnetic field; and FIG. 8 is a fragmentary, greatly enlarged sectional view showing one form of electromagnetic adhesive.

DESCRIPTION OF PREFERRED EMBODIMENT

A web 10 of plastic material is wound in a reel 12 on a tube 14. This web 10 is unwound from the reel 12 by feed rolls 16; and the web 10 is advanced by similar feed rolls 18 across a support 20 which preferably has a flat top extending in a generally horizontal direction. For a portion of the length of the support 20 there is a buffer sheet 22 under the web 10.

A die 24 is supported above the web 20 and buffer sheet 22 and is movable toward and from the buffer sheet 22 as indicated by the double headed arrow 26. The buffer sheet 22 provides a backing under the web 10 and throughout the area of pressure of the die 24 against the web 10 during a cover forming operation. The sheet 22 can be made of phenolic sheeting or fish paper; either material can be from 0.015 to 0.020 inch, these figures being given merely by way of illustration.

The die 24 constitutes one electrode of a high frequency electric field and there is another electrode 30 located under the buffer sheet 22 for cooperation with the upper electrode comprising the die 24. High frequency power lines 32 and 33 are connected with the die 24 and electrode 30, respectively. When power is supplied to the lines 32 and 33, the high frequency electric field between the electrodes 24 and 30 heats the plastic of the web to to an elevated temperature at which the plastic will flow in response to pressure exerted by rules 35, 36 and 37 (FIG. 5) of the die 24.

With the plastic of the web 10 heated to a flowable condition, the die 24 moves down and causes the rule 35 to form a depression 35a in the plastic while the rules 37 and 36 form depressions 37a and 36a of lesser depth than the depression 35a. Referring to FIG. 2, the depression 35a extends all the way around the periphery of a cover 40 which can be torn from the web along a tear line 42 (FIG. 5) constituting a "tear seal" at the bottom of the depression 35a. The depression 37a extends across the full height of the cover and constitutes one of the hinge lines of the cover. There is a similar hinge line 37a' formed by another rule not shown in FIG. 5. The depression 36a extends generally parallel to the depression 35a and is for optional decorative purposes. It may be made with a depth which varies along its length so that the depression resembles stitching through the cover. Other decorative effects can be produced and there may be more than one such line 36a.

If desired, the die 24 can be made with rules which form depressions constituting letters which provide the title for the book or other information on the cover. Decorative effects can also be produced by the die 24; but the web 10 may be a calendered web which has surface decoration already on it before it is passed under the die 24.

In the preferred die 24 only the plastic material immediately under the rules is heated and this has the advantage that less power is used; plastic near the depressions is not heated and cools the depressed plastic by conduction so that the cover blanks can be torn loose promptly; and any embossing or other decorative treatment on the original web is not subjected to strong heating and possible impairment over areas adjacent to or surrounded by depressed lines.

In order to have the cover heated by a high frequency electric field, it is necessary to use a plastic material which is heated in the presence of such an electric field. The preferred material is polyvinyl chloride or polyurethane. Copolymers of vinyl chloride with vinylidine chloride or vinyl acetate are also suitable but the vinyl chloride should be the predominant monemer. The term "polyvinyl chloride" as used herein includes such copolymers.

Good covers can be made with webs having a thickness between 10 and 25 mils. Material of this thickness is generally referred to as "sheeting". For purposes of this description, the material from which the covers are made will be referred to generically as a "web", and this does not connote any particular length of material except that the material is longer than the length of the cover which is to be constructed from the material. In referring to the web as "continuous" the description is intended to describe a web long enough for the construction of many successive covers formed and removed from the length of the web.

The tear line at the bottom of the depression 35a is preferably very thin. Thickness of 1 and 2 mils give good results, but this is given merely by way of illustration.

The ease with which the web tears along the depression 35a and the flexibility of the material of the web can be controlled by the amount of plasticizer added when manufacturing the web. The preferred amount of plasticizer is between 30 and 60 pounds for each hundred pounds of polyvinyl chloride or copolymer. Plasticizers suitable for the purpose are: Polyester plasticizers of high and intermediate molecular weight such as Paraplex G-41 and Paraplex G-54, respectively sold by Rohm & Haas Company, of Philadelphia, Pennsylvania, tri-mellitates, and high molecular weight soybean oil epoxide, the latter being both a plasticizer and stabilizer for polyvinyl chloride. Dioctyl phthalate can also be used as a plasticizer with suitable protection against migration.

The feed rolls 16 and 18 are operated intermittently so as to advance the web for slightly more than a length of a cover blank with each operation of the feed rolls. This intermittent operation is necessary so that the web is stationary at the time that the die 24 closes on the web to form the depressions as already described. The heating of the web for the forming of the depressions is a short operation. The die can be in closed position for a period of 4 to 6 seconds with the power on for 2 seconds. When using a web having a thickness of approximately 10 to 25 mils, the web can be sufficiently heated by from 2 to 20 KW at a frequency of from 18 to 150 megahertz with 27.12 mHz having the advantage of compliance with F.C.C. regulations and not requiring a screen room for shielding. All of these figures are given merely by way of illustration.

Referring again to FIG. 1, the left hand side of this figure illustrates diagrammatically the tearing out of a cover 40b from the web 10, the operation being shown as performed by an operator's hand 46, but suction fingers and other well-known manipulators can be used to obtain more complete automation. Materials used as plasticizers are likely to migrate out of the cover and into adhesive that is bonded to the cover. In a substantial period of time, this migration of plasticizer into the adhesive may be sufficient to weaken the adhesive to the point where the adhesive is no longer strong enough to maintain the cover and filler firmly bonded together. One way in which such migration can be prevented is by applying a barrier material 48 on the plastic at the area which will be touched by the adhesive and this material 48 is shown in FIG. 1 as being sprayed on the web 10 by a nozzle 50.

FIG. 3 shows a plurality of leaves 52 of a filler 54 which is to be bound into the cover made from the web 10 of FIGS. 1 and 2. The leaves 52 are brought together in the desired assembled relation and clamped in place by a clamping means 56. The spine of the filler 54 is then coated with adhesive 58 by a brush 60 or by a spray or any other suitable applicator. If the leaves 52 have individual rearward edges not connected with any other leaf, or have accordion fold, then the adhesive 58 contacts with the rearward edge of every leaf to secure the leaves together and thus stabilize the filler 54 so that the leaves remain in assembled relation without further clamping.

If the leaves in 52 are in separate signatures and only the rearward fold of each signature is coated with adhesive 58, then it is necessary that the individual signatures be held together in some other way; and there are many conventional ways of holding signatures together such as staples, sewing and adhesive. For most effective automation, the signatures can be made of weldable paper and bonded at the last folding station on the folding machine.

After stabilizing the filler 54, it can be handled subsequently during the binding operations without keeping the pages clamped together since the adhesive 58 holds them in assembled relation. The pages are then trimmed as illustrated diagrammatically in FIG. 4. This figure is a view looking at the spine of the filler 54 with the adhesive 58 shown in elevation and with the upper and lower edges of the leaves in the process of being trimmed by blades 62 of trimming apparatus. It will be understood that the forward edge of the page of the filler 54 are similarly trimmed after the filler has been stabilized by the adhesive 58.

FIG. 6 shows the cover 40b after being severed from the web 10 and in position for applying it to a filler 54 as shown in FIG. 7. The area of the cover between the hinge lines formed by the depressions 37a and 37a' is placed against the adhesive 58. Since this adhesive is allowed to harden after being applied as shown in FIG. 3, in order to hold the leaves of the filler securely in position (stabilized), the adhesive is not in condition when brought to the cover 40b to adhere to the cover. Additional adhesive may be applied over the adhesive 58, but in the preferred method of this invention, the adhesive 58 is reactivated as the filler rests in a holder or support 66. This reactivation step lends itself better to automation and avoids the necessity of working with hot melt adhesive which must be maintained at a certain temperature.

By making the adhesive 58 an electromagnetic adhesive, it can be reactivated by heat generated within the adhesive itself when the spine of the filler 54 is brought within the magnetic field of an alternating current coil 70. This coil 70 is supplied with alternating current of suitable high frequency from power lines 72 with a control switch 74 for turning on the power when reactivation is desired.

One way to make the adhesive an electromagnetic adhesive is to disperse powdered metal, preferably iron filings, throughout the adhesive. The filings are inductively heated by the alternating current field from the coil 70 and the adjacent adhesive is fused at a temperature which causes it to bond the filler to the plastic cover 40b. If the area to which the adhesive is applied has been coated with a barrier coat to prevent migration of the plasticizer, then it is important that the adhesive 58 is one that will adhere strongly to the barrier coat and the barrier coat must always be a material which will adhere to both the cover and the adhesive. Suitable material for barrier coats are organic solvent solutions of polyacrylates and vinyls, such as 55 parts of polymethylmethacrylate and 45 parts of solvent type copolymer of vinyl chloride and vinyl acetate in methylethyl ketone. Adhesives which adhere strongly to plastic covers such as polyvinyl chloride and copolymers of polyvinyl chloride, are hotmelts based on polyester resins, and waterbase liquid adhesives made from polyvinyl acetates.

One of the outstanding advantages of plastic covers is that the plastics have much higher pic strength than do papers. Even though a very strong adhesive is used to connect a filler to a paper cover, the full strength of the adhesive cannot be utilized because the paper of the cover will delaminate when there is considerable pull on the filler tending to pull it loose from the paper cover. Because of this high pic strength, the adhesive can bind the rearward edges of paper leaves to the spine of a plastic cover with extremely high strength. This makes it possible to bind books with covers that overlap the edge regions of the pages without the use of endpapers to hold the filler to the covers as is common with stiff cover books of conventional constructions.

An adhesive which is inductively heated by using metal powder, as described above, can be reactivated by the coil 70 with a much lower frequency electric field than is required for heating the plastic web 10 of FIG. 1. Thus the frequency used with electrodes 24 and 30 of FIG. 1 is much higher than used with the coil 70 and even though the adhesive 58 is on the side of, the cover 40b opposite that on which the coil 70 is located, the intervening plastic 40b is not as highly heated as in the cover forming operation illustrated in FIGS. 1 and 2.

After the cover 40b has been applied to the filler 54 and bonded to the filler by the adhesive 58, under pressure applied by a platen 75 in which the coil 70 is located, the holder 66 can then be removed, or the filler 54 lifted from this holder 66 so that the front and back panels 77 and 78 can swing down into closed position as shown in dotted lines in FIG. 7.

Another way of making electromagnetic adhesive is by coating a thin strip of metal (FIG. 8) with adhesive 82 and 84 on opposite sides of the metal 80 and firmly bonded to the metal strip. If desired, the metal strip can be perforated with holes 86 so that there will be regions over the area of the metal strip 80 where the adhesive layer on one side is directly bonded to the adhesive layer on the other side. The metal strip 80 is heated inductively and transmits its heat to the adhesive layers 82 and 84.

The adhesive layers 82 and 84 may be made of the same adhesive; or they may be made of different adhesives with the adhesive 82 especially selected for its ability to bond to plastic while the adhesive 84 is selected for its ability to bond the filler or its stabilizing agent. Both must bond tenaciously to the metal strip 80 and the metal strip can be treated ahead of time in order to improve the bonding characteristics of the coating with the metal. If desired, the adhesive 82 can be one with a lower melting point since during the reactivating step, it is only the adhesive which is to bond to the plastic which need be softened to a bonding condition.

The preferred embodiment of the invention has been illustrated and described, but changes and modifications can be made and some features can be used in different combinations without departing from the invention as defined in the claims.

What is claimed is:

1. The method of binding a book which comprises making successive book covers, each in one operation in a single station from a portion of a preformed sheet of homogeneous synthetic high polymer thermoplastic material of higher pick strength than paper, which method comprises supplying the synthetic high polymer as an elongated sheet of uniform thickness and in intermittent steps between confronting elements comprising a die and a base element having relative movement toward and from one another, the die having narrow rules projecting therefrom toward the base element, a first of said rules being a closed figure and being shaped to the outline of a cover that is to be severed from the elongated sheet, and other rules located within said figure and in position to form hinge lines for the cover, moving the first rule of the die into contact with the plastic sheet, continuing the movement of the first rule toward the base element and through a stroke that displaces the plastic for substantially the full thickness of the sheet around the outline of a cover, and also moving the other rules of the die into contact with the plastic to heat and displace the plastic of the sheet for a depth less than the depth of displacement of the first rule and for a depth dependent on the displacement of plastic by the first rule and at locations that provide hinge lines for the cover, intermittently moving the sheet material to advance it from under the die, and bringing a new portion of sheet material under the die, repeating the operation of the die through another cycle to make another cover after each movement of additional material into positions under the die, holding the successive covers in the sheet while advancing the covers and the plastic sheet together beyond the die and to a delivery station, separating each successive cover from the rest of the sheet along said outline of the cover at the delivery station, assembling and clamping leaves that make a book filler of a thickness substantially equal to the distance between the hinge lines of the cover, stabilizing the book filler by application of adhesive to the spine of the filler while the leaves are clamped in assembled relation, removing the clamps when the adhesive is set, trimming the stabilized filler to a height and width less than the height and width of the front and back cover panels so that the cover will overhang the edges of the leaves of the filler, then heating said adhesive for adhesively securing the high pick strength spine panel to the stabilized filler while the surface of the spine panel is at a temperature substantially lower than the deforming temperature and the spine panel remains in a solid, unfused state of the preformed plastic sheet from which the cover is made, and using an adhesive that is strong enough to bind the filler to the cover without end papers, said book covers being made from a sheet of material from the group of plastics that are heated by exposure to a high frequency electric field and that are of a composition that tears with a smooth tear along a tear line, exposing the sheet to a high frequency electric field by using said base element and the rules of the die as the electrodes of the high frequency field at said single station, and displaceing material in the sheet by pressure applied to the heated localized areas of the sheet between the electrodes of the high frequency electric field, reducing the thickness of the plastic along said localized areas to a thin section along which the cover can be torn from the sheet at the delivery station and similarly heating and displacing at said single station other material of the sheet along other localized areas where the front and back panels connect with the spine panel to form the hinge lines of the cover.

2. The method described in claim 1 characterized by displacing material of the top surface of the sheet for decorative effect thereon, displacing material along the line of severance with curved corners at the top and bottom portions of both ends of the cover.

3. The method described in claim 1 characterized by the sheet being a plasticized material, and applying to the side of the sheet that will constitute the inside of the cover between hinge lines, a barrier coating that will prevent migration of plasticizer from the cover to adhesive used at the spine of the book filler to which the cover is to be applied.

4. The method described in claim 1 characterized by making successive covers from a sheet material as it is unwound from a reel, forming a tear line along the outline of each cover.

5. The method described in claim 1 characterized by using an adhesive that contains metal particles, and heating the adhesive by eddy currents generated in the metal particles by exposing the adhesive to the alternating magnetic field.

6. The method described in claim 1 characterized by the adhesive being applied as a laminate on a metal strip, and activating the adhesive by exposing the metal strip to an alternating magnetic field.

7. The method described in claim 1 characterized by applying adhesives to opposite sides of a strip, adhering the strip to the filler with the adhesive on one side of the strip to stabilize the filler, and adhering the filler to the cover by bringing the cover into contact with the adhesive on the side of the strip opposite the side that is adhered to the filler.

8. The method described in claim 7 characterized by applying one adhesive to stabilize the filler and a second adhesive, compatible with the first, to adhere the cover to the filler.

9. The method described in claim 1 characterized by applying to the spine of the filler an adhesive that is softened by an alternating magnetic field but that cools to a hardened condition at room temperature, stabilizing the filler to hold the leaves in the desired assembled relation by said adhesive, trimming the filler leaves to smaller size with the adhesive cool and hard, and reactivating the adhesive by exposing it to an alternating magnetic field to bond the cover to the filler after the cover has been applied to the filler and the surface of the filler spine is no longer accessible because it is covered by the spine panel of the cover.

10. The method described in claim 1 characterized by stabilizing the filler by applying to the spine thereof an adhesive that is hard at room temperature but that is softened to an activated state by exposure to an alternating magnetic field across the spine and of different frequency from that used for the dielectric heating of the cover, said different frequency being one that leaves the plastic of the cover in a solid unfused state.

* * * * *